US008189126B2

(12) United States Patent
Wang et al.

(10) Patent No.: US 8,189,126 B2
(45) Date of Patent: May 29, 2012

(54) DISPLAY DEVICE

(75) Inventors: Ping-Fu Wang, Hsin-Chu (TW);
Kuang-Chou Lai, Hsin-Chu (TW);
Sheng-Kai Chang, Hsin-Chu (TW);
Nan-Ching Lee, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 557 days.

(21) Appl. No.: 12/370,934

(22) Filed: Feb. 13, 2009

(65) Prior Publication Data
US 2010/0134704 A1 Jun. 3, 2010

(30) Foreign Application Priority Data

Dec. 2, 2008 (TW) ............................ 97146846 A

(51) Int. Cl.
*H04N 5/64* (2006.01)
(52) U.S. Cl. ....................................... 348/843; 348/836
(58) Field of Classification Search ............ 52/836–843; 349/58
See application file for complete search history.

(56) References Cited

U.S. PATENT DOCUMENTS

| | | | | |
|---|---|---|---|---|
| 5,479,285 A * | 12/1995 | Burke | ............................. | 349/58 |
| 6,144,552 A * | 11/2000 | Whitcher et al. | .......... | 361/679.3 |
| 6,166,788 A | 12/2000 | Ha et al. | | |
| 6,256,075 B1 * | 7/2001 | Yang | ............................. | 348/843 |
| 6,812,976 B2 | 11/2004 | Satonaka | | |
| 6,930,731 B2 | 8/2005 | Hirota et al. | | |
| 7,221,410 B2 | 5/2007 | Choi et al. | | |
| 7,518,624 B2 * | 4/2009 | Ford et al. | ...................... | 348/383 |
| 7,965,344 B2 * | 6/2011 | Wang et al. | ................... | 348/826 |
| 2002/0171774 A1 * | 11/2002 | Lee | ................................ | 348/731 |
| 2004/0165119 A1 | 8/2004 | Choi et al. | | |
| 2006/0133018 A1 | 6/2006 | Okuda | | |
| 2007/0023733 A1 | 2/2007 | Ooe et al. | | |
| 2008/0089018 A1 * | 4/2008 | Kim et al. | ...................... | 361/681 |
| 2009/0141198 A1 * | 6/2009 | Kim | ................................ | 348/836 |
| 2009/0207102 A1 * | 8/2009 | Choi | ................................ | 345/58 |

(Continued)

FOREIGN PATENT DOCUMENTS

EP 1168837 A1 1/2002

(Continued)

OTHER PUBLICATIONS

Office Action dated Jun. 23, 2001 issued in corresponding Japanese application No. 2009-055313.

*Primary Examiner* — Brian Glessner
*Assistant Examiner* — Adam Barlow
(74) *Attorney, Agent, or Firm* — Bacon & Thomas, PLLC

(57) ABSTRACT

A display device including a control module, a plastic rear cover, a display panel, a buffer element and a plastic front cover is provided. The plastic rear cover includes a plurality of supporting ribs protruded from an inner surface of the plastic rear cover. An outer surface of the plastic rear cover has a receiving portion, in which the control module is received. The display panel includes a first surface and a second surface opposite to the first surface, and the first surface is disposed in accordance with the inner surface of the plastic rear cover. The buffer element is leant against the second surface. The plastic front cover has a display opening used for exposing a part of the second surface, and is leant against the buffer element.

19 Claims, 12 Drawing Sheets

U.S. PATENT DOCUMENTS

2009/0225240 A1* 9/2009 Suzuki et al. .................. 348/843
2011/0001893 A1* 1/2011 Yamamoto .................... 348/836

FOREIGN PATENT DOCUMENTS

| | | |
|---|---|---|
| JP | 11-202789 | 7/1999 |
| JP | 2001-218132 A | 8/2001 |
| JP | 2003-167235 | 6/2003 |
| JP | 2004-201273 | 7/2004 |
| JP | 2006-154366 A | 6/2006 |
| JP | 2007-034939 | 2/2007 |
| JP | 2007-206689 | 6/2007 |
| JP | 2007-233402 A | 9/2007 |
| JP | 2008-47144 A | 2/2008 |
| TW | 594272 | 6/2004 |
| TW | I234675 | 6/2005 |
| TW | I281137 | 5/2007 |
| TW | I286633 | 9/2007 |
| WO | WO 2007/035770 A1 | 3/2007 |

* cited by examiner

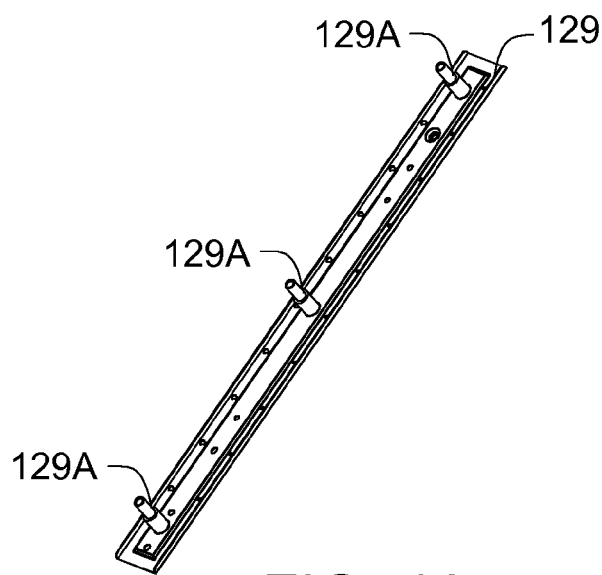
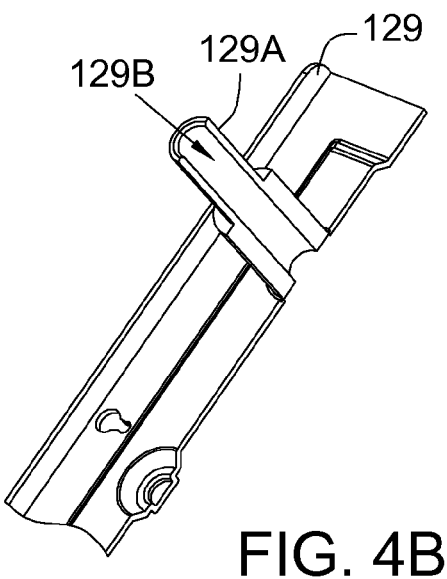
FIG. 4A
FIG. 4B
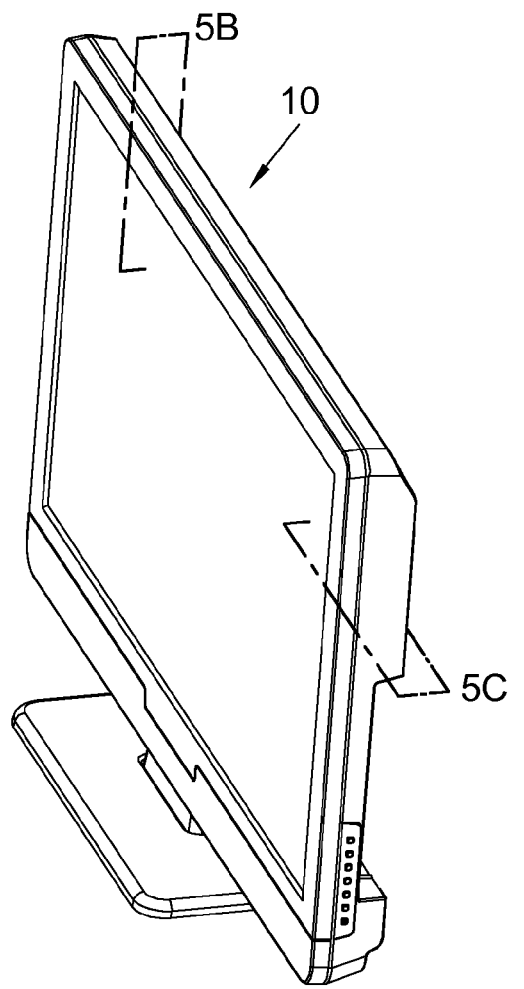
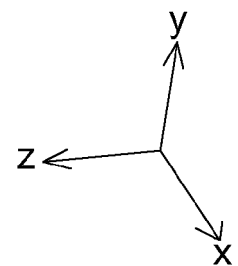
FIG. 5A

DISPLAY DEVICE

This application claims the benefit of Taiwan application Serial No. 97146846, filed Dec. 2, 2008, the subject matter of which is incorporated herein by reference.

BACKGROUND OF THE INVENTION

1. Field of the Invention

The invention relates in general to a display device, and more particularly to a display device, such as a full integration TV (FIT) or a full integration module (FIM), with simple structure and easy assembly.

2. Description of the Related Art

Flat display technology, particularly the liquid crystal display technology, is now very mature, and many electronic devices such as desktop computer, notebook computer and flat TV adopt display devices relevant to the liquid crystal display technology, not only reducing the volume of the device but also providing better image quality. In addition to further development and application of the display technology, the innovation of relevant components of the display device has become a focus of development to many manufacturers in recent years.

In response to the trend in the industry, manufacturers keep improving the technique in the manufacturing process of relevant materials of the display device and at the same time search for new design in the structure of the display device. According to the conventional process of manufacturing the display device, a display module is normally manufactured first and then passed to a system plant for assembly. The display device includes a display panel and a front and a rear frame for fixing the panel as well as other components such as lamps and optical films. These components are integrated together first and then are protected by outer casings. However, the repetition in the structural support of the display device is a waste of materials, further increasing the weight of the overall structure and incurring higher cost.

SUMMARY OF THE INVENTION

The invention is directed to a display device with a simplified structure, not only maintaining the structural strength with less material, but also living up to manufacturers' expectation of display products.

According to a first aspect of the present invention, a display device including a control module, a plastic rear cover, a display panel, a buffer element and a plastic front cover is provided. The plastic rear cover includes a plurality of supporting ribs protruded from an inner surface of the plastic rear cover. An outer surface of the plastic rear cover has a receiving portion, in which the control module is received. The display panel includes a first surface and a second surface opposite to the first surface, and the first surface is disposed in accordance with the inner surface of the plastic rear cover. The buffer element is leant against the second surface. The plastic front cover has a display opening used for exposing a part of the second surface, and is leant against the buffer element.

According to a second aspect of the present invention, a display device including a plastic rear cover, a display panel, a main buffer element, a secondary buffer element, a metal bracket and a plastic front cover is provided. The display panel includes a first surface and a second surface opposite to the first surface, and the first surface is disposed in accordance with an inner surface of the plastic rear cover. The main buffer element extended along a vertical direction is leant against the second surface, and the secondary buffer element extended along a horizontal direction is also leant against the second surface. The metal bracket extended along a horizontal direction is leant against the secondary buffer element. The plastic front cover has a display opening used for exposing a part of the second surface, and is leant against the main buffer element and the secondary buffer element.

According to a third aspect of the present invention, a display device including a plastic rear cover, a display panel and a plastic rear cover is provided. The plastic rear cover includes an outer surface and an inner surface opposite to the outer surface. A plurality of supporting ribs and slanted supporting ribs are respectively protruded from a central area and a peripheral area of the inner surface. The display panel includes a first surface and a second surface opposite to the first surface, wherein the first surface is disposed in accordance with the inner surface of the plastic rear cover. The plastic front cover is disposed in accordance with the second surface.

The invention will become apparent from the following detailed description of the preferred but non-limiting embodiments. The following description is made with reference to the accompanying drawings.

BRIEF DESCRIPTION OF THE DRAWINGS

FIG. 4A is diagram of a wall-mounted bracket;

FIG. 4B is a partial sectional view of the wall-mounted bracket in FIG. 4A;

FIG. 5A is a diagram showing the display device in FIG. 1A after assembled;

DETAILED DESCRIPTION OF THE INVENTION

Figure 1A:
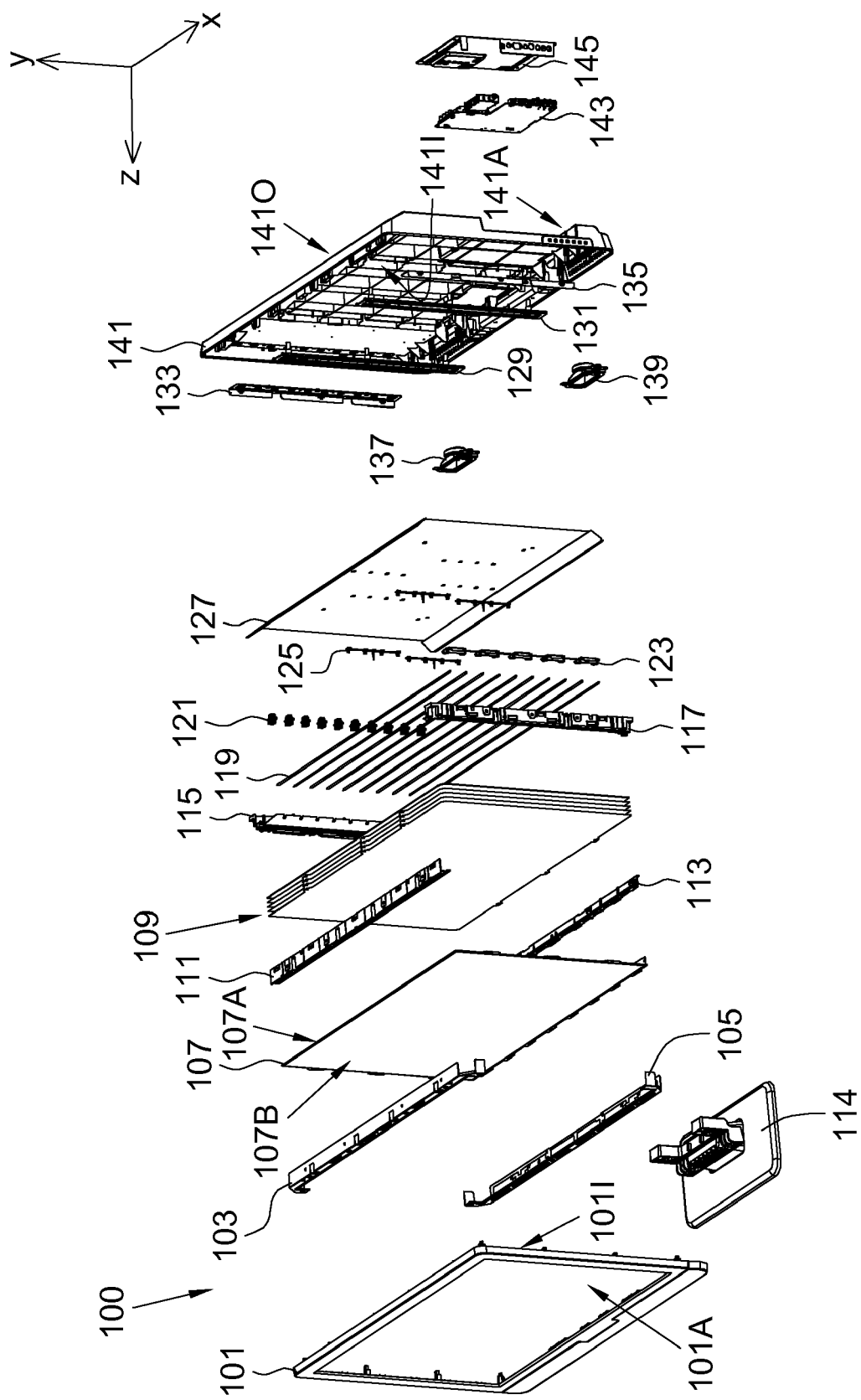
FIG. 1A is an exploded diagram showing the components of a display device of a preferred embodiment of the invention.
Figure 1B:
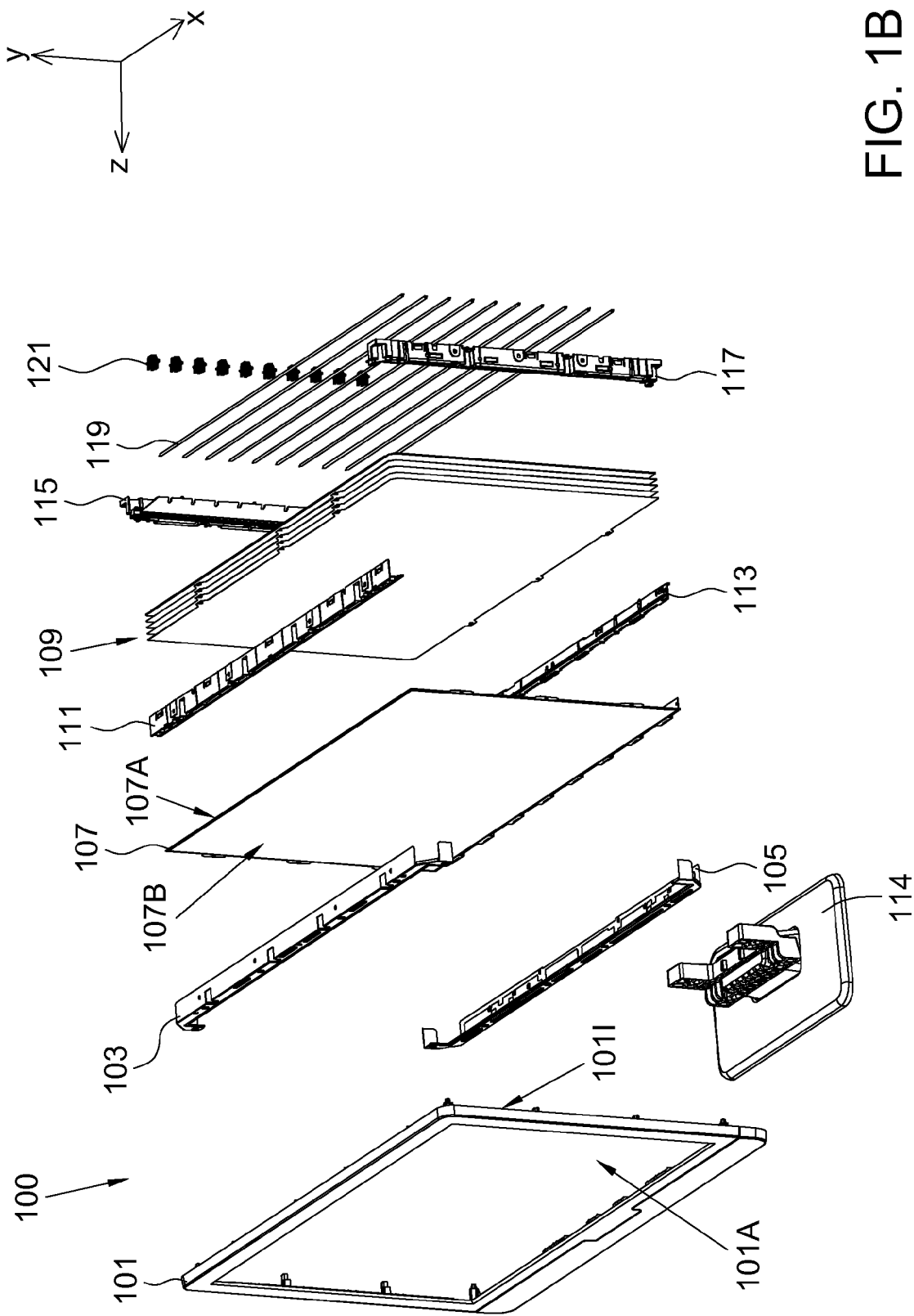
FIGS. 1B and 1C are diagrams showing different portions of the display device in FIG. 1A.
Figure 1C:
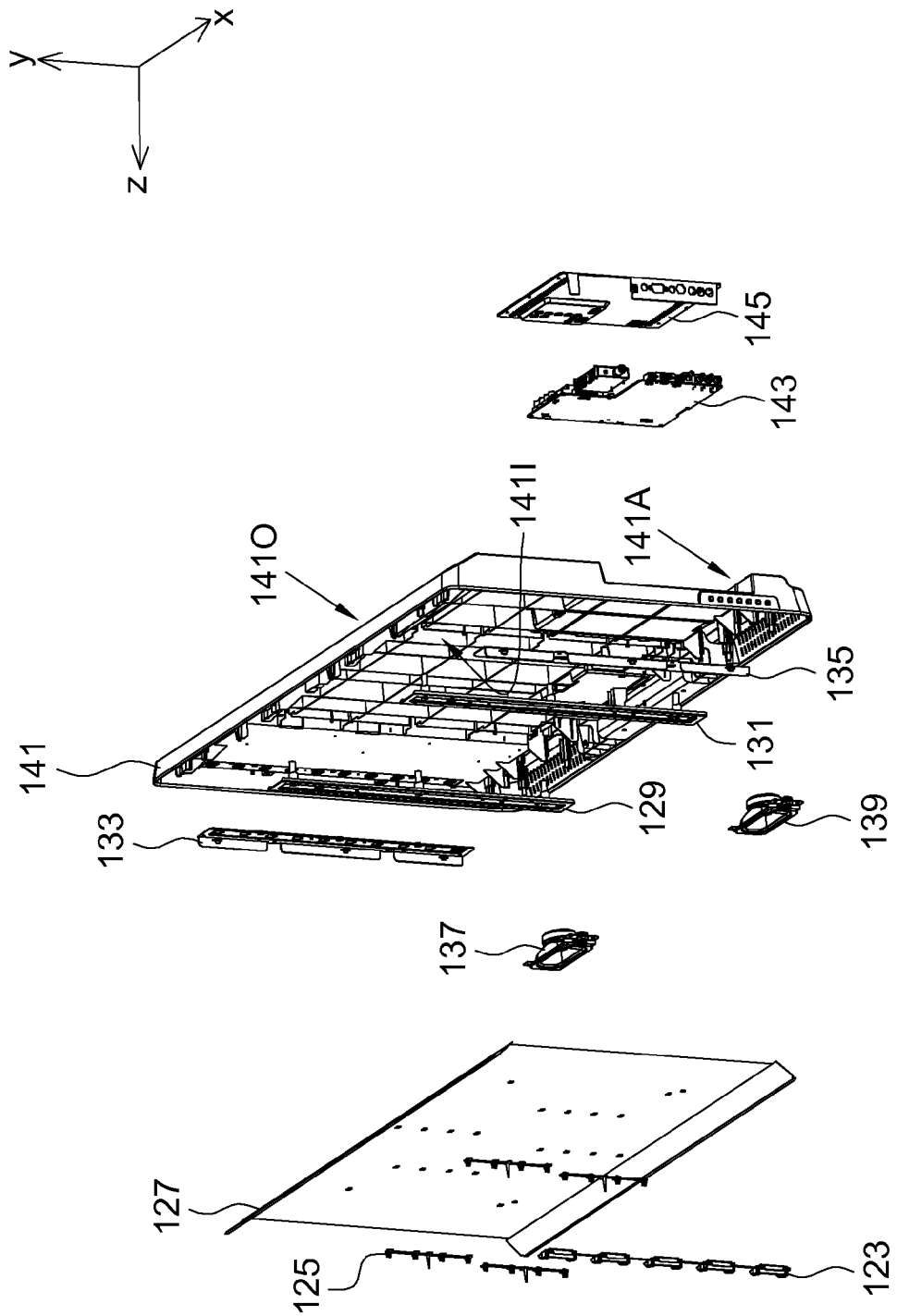

FIG. 1A is an exploded diagram showing the components of a display device of a preferred embodiment of the invention. FIGS. 1B and 1C are diagrams showing different portions of the display device in FIG. 1A. As shown in FIGS. 1A and 1B, the display device 100 includes a plastic front cover 101, two metal brackets 103, 105, a display panel 107, a plurality of optical films 109, two assisting brackets 111 and 113 and a stand 114. The plastic front cover 101 has a display opening 101A. The display panel 107 has a first surface 107A and a second surface 107B opposite to the first surface 107A, wherein, the second surface 107B is disposed in accordance with the plastic front cover 101, so that the display opening 101A exposes a part of the second surface 107B of the display panel 107. The metal brackets 103 and 105 are, for example, bar-shaped brackets disposed along a horizontal direction (or the x direction) of the display panel 107 on the top and the bottom edges of the display panel 107 for retaining and supporting the display panel 107 so as to fix the display panel 107 in the display device 100. The assisting brackets 111 and 113 are respectively disposed on the top and the bottom edges of the optical films 109 for retaining the optical films 109 and keeping a suitable distance between the optical films 109 and the display panel 107. The optical films 109 can be a combination of diffusers, prisms, and splitters. The stand 114 is used for supporting the entire structure of the display device 100.

As shown in FIG. 1A, the display device 100 further includes two lamp brackets 115 and 117, a plurality of lamps 119, a plurality of lamp slots 121, a plurality of lamp supporters 123, a plurality of spacers 125 and a reflector 127 at the rear side of the optical films 109. The lamp brackets 115 and 117 are disposed along a vertical direction (or the y direction) at the left and the right edges of the display device 100. One end of each lamp 119 is inserted into one lamp slot 121, and is positioned in the display device 100 through the lamp bracket 115. The other end of the lamp 119 is disposed on the lamp supporter 123 and is positioned in the display device 100 through the lamp bracket 117. The spacers 125 are disposed on the reflector 127 to assist in supporting the lamps 119 and the optical films 109 for keeping a suitable distance between the optical films 109 and the reflector 127.

As shown in FIGS. 1A and 1C, the display device 100 further includes two wall-mounted brackets 129 and 131, another two assisting brackets 133 and 135, two speakers 137 and 139, a plastic rear cover 141, a control module 143 and a control module casing 145. The wall-mounted brackets 129 and 131 are directly disposed on the inner surface 141I of the plastic rear cover 141 for providing a wall-mounted function for the display device 100. The assisting brackets 133 and 135 are also disposed on the inner surface 141I of the plastic rear cover 141. The speakers 137 and 139 are disposed between the plastic front cover 101 and the plastic rear cover 141. The outer surface 141O opposite to the inner surface 141I of the plastic rear cover 141 has a receiving portion 141A, in which the control module 143 is received. The control module casing 145 is disposed in accordance with the control module 143 for protecting and hiding the control module 143.

The assembly of the display device 100 of the present embodiment of the invention is disclosed below. Also, the structures of the components are further elaborated.

Figure 2A:
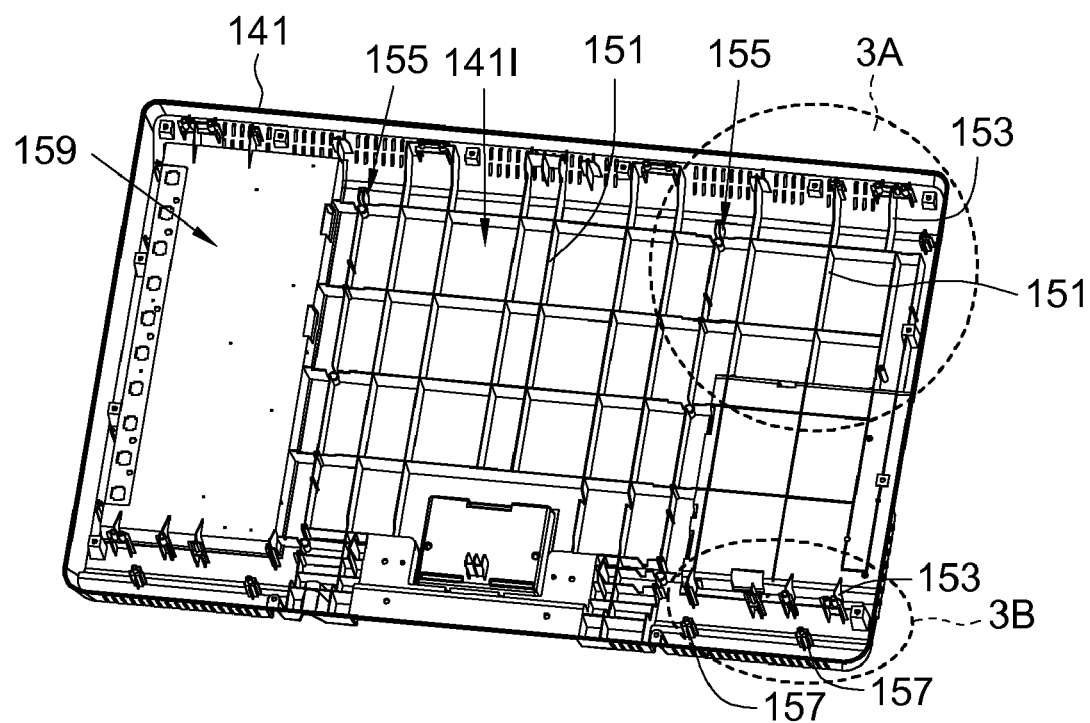
FIGS. 2A to 2J are diagrams of continual assembly of the display device in FIG. 1A.

FIGS. 2A to 2J are diagrams of continual assembly of the display device 100 in FIG. 1A. During assembly the components are assembled to the plastic rear cover 141 one by one. As shown in FIG. 2A, a plurality of supporting ribs 151 are protruded from the central area of the inner surface 141I of the plastic rear cover 141, wherein these supporting ribs 151 form a grid structure so as to support other components in the central area of the plastic rear cover 141 and enhance the structural strength of the plastic rear cover 141. A plurality of slanted supporting ribs 153 are protruded from the peripheral area of the inner surface 141I of the plastic rear cover 141.

Figure 3A:
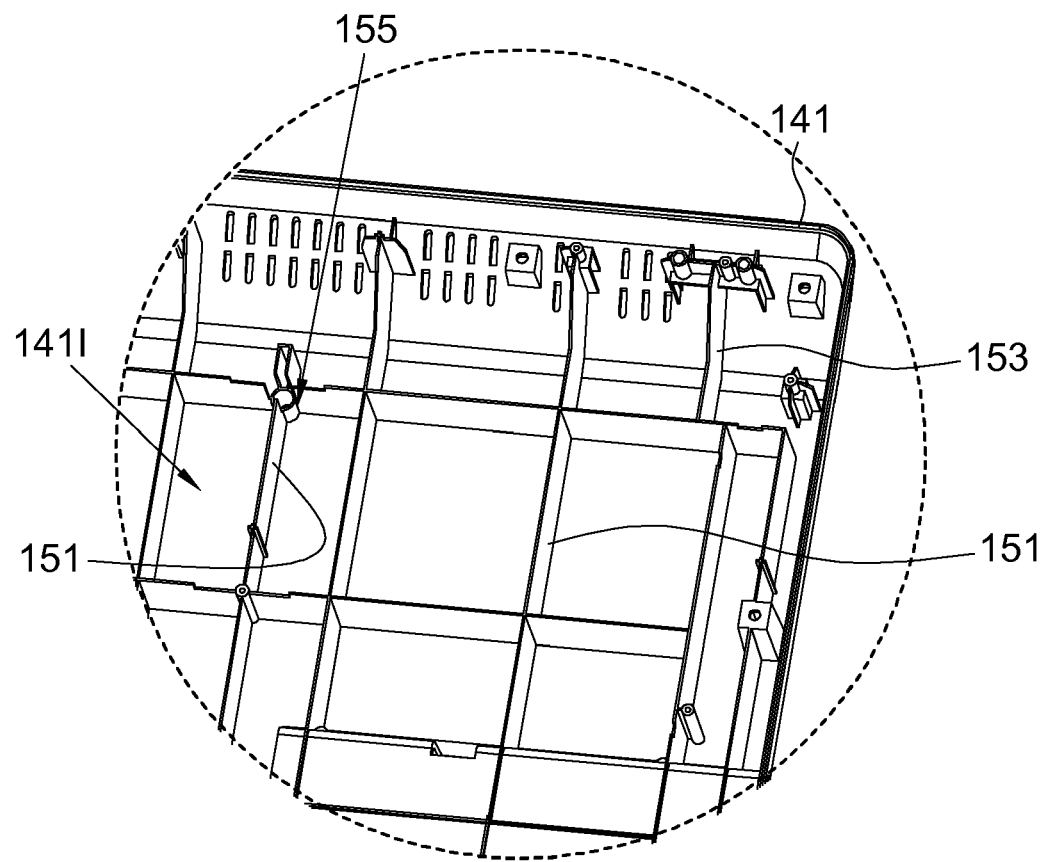
FIGS. 3A to 3B are partial diagrams of different portions of the plastic rear cover in FIG. 2A.
Figure 3B:
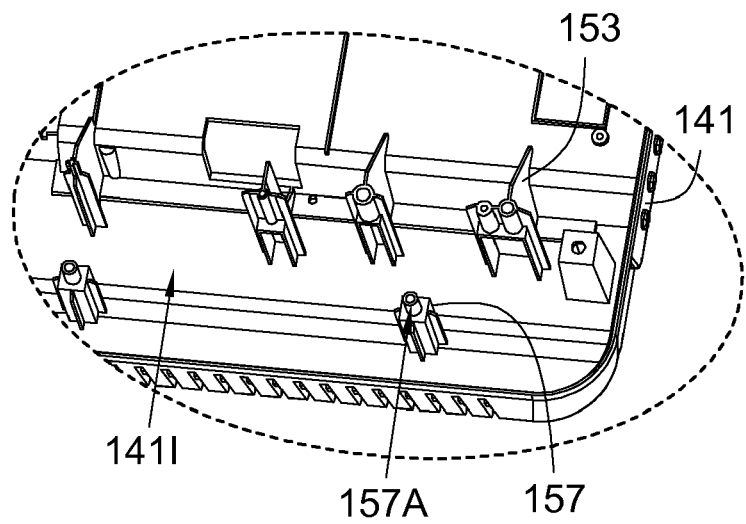

FIGS. 3A to 3B are partial diagrams of different portions of the plastic rear cover 141 in FIG. 2A. As shown in FIG. 3A, slanted supporting ribs 153 are slantwise extended from the edge of the plastic rear cover 141 to the central area of the plastic rear cover 141 for supporting the edge of the reflector 127 (shown in FIG. 1A). In this embodiment, the slanted supporting ribs 153 are connected to the supporting ribs 151. The plastic rear cover 141 further has a plurality of through holes 155 penetrating to the outer surface 141O from the inner surface 141I of the plastic rear cover 141 for coupling with the wall-mounted brackets 129 and 131. As shown in FIG. 3B, a plurality of column structures 157 are protruded from the inner surface 141I of the plastic rear cover 141, wherein each column structure 157 has a locking hole 157A for coupling with other component such as the speakers 137 and 139 (shown in FIG. 1A) for example. As shown in FIG. 2A, there is a supporting surface 159 located within the plastic rear cover 141, wherein the supporting surface 159 is aligned with the top surfaces of the supporting ribs 151, that is, the height of the supporting surface 159 is properly the same as or a little larger than the height of the supporting ribs 151.

Figure 2B:
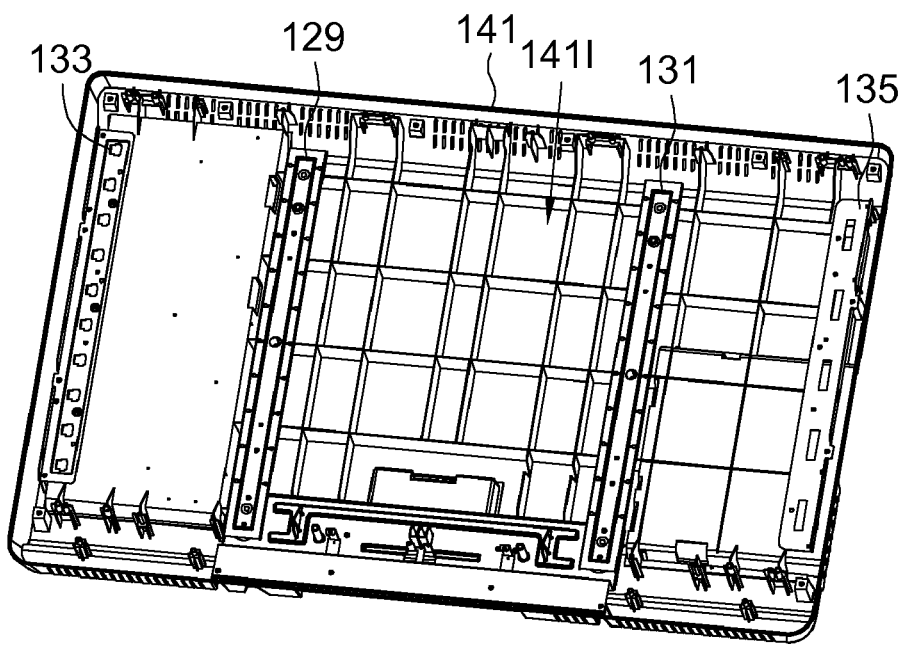

Then, as shown in FIG. 2B, the wall-mounted brackets 129 and 131 are assembled to the plastic rear cover 141. Refer to FIGS. 4A to 4B. FIG. 4A is a diagram of a wall-mounted bracket. FIG. 4B is a partial sectional view of the wall-mounted bracket in FIG. 4A. Let the wall-mounted bracket 129 be taken for example. The rear side of the wall-mounted bracket 129 faces the plastic rear cover 141, and the front side of the wall-mounted bracket 129 faces the reflector 127. As shown in FIG. 4A, the rear side of the wall-mounted bracket 129 has a plurality of protrusions 129A each having a wall-mounted hole 129B (shown in FIG. 4B). The wall-mounted hole 129B is disposed in accordance with the through hole 155 (shown in FIG. 3A). When the wall-mounted bracket 129 is assembled to the plastic rear cover 141, the protrusion 129A is inserted into the through hole 155, and the wall-mounted bracket 129 is disposed and leant against the supporting ribs 151. Besides, the two assisting brackets 133 and 135 are also assembled to the plastic rear cover 141 as shown in FIG. 2B.

Figure 2C:
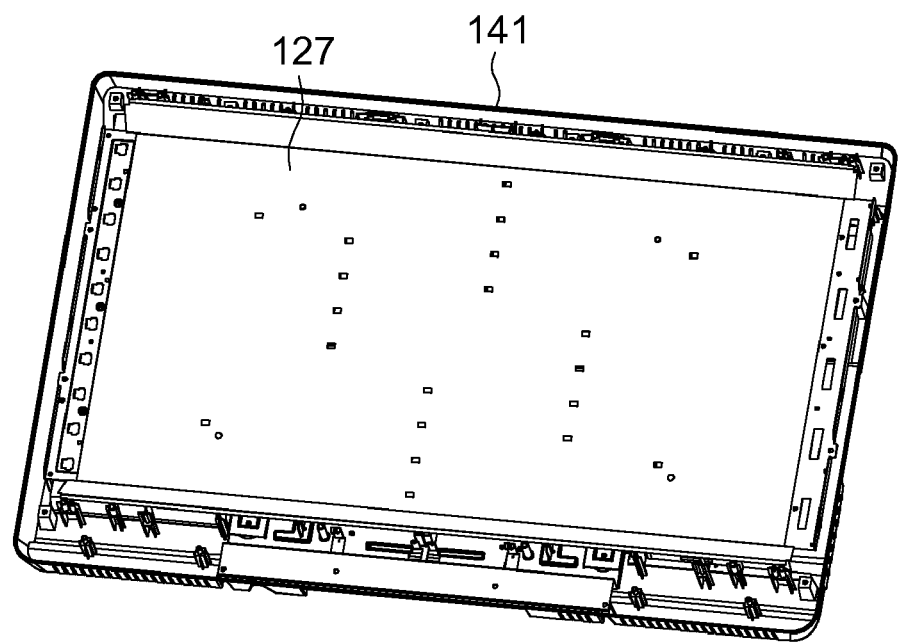

Next, as shown in FIG. 2C, the reflector 127 is assembled to the plastic rear cover 141. The edge of the bottom surface of the reflector 127 is leant against the slanted supporting ribs 153 (shown in FIG. 2A), a part of the bottom surface of the reflector 127 is attached on the supporting surface 159, and another part of the bottom surface of the reflector 127 is leant against the two wall-mounted brackets 129 and 131 (shown in FIG. 2B).

Figure 2D:
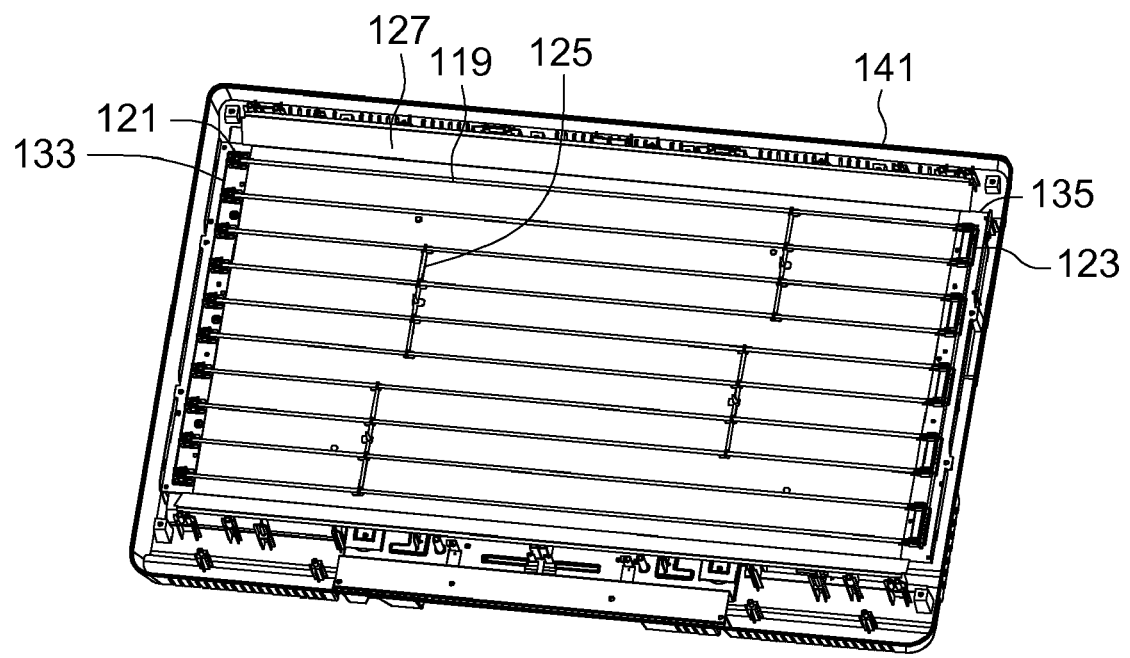

Afterwards, as shown in FIG. 2D, the spacers 125 are disposed on the reflector 127, and the lamp slots 121 and the lamp supporters 123 are respectively disposed on the left and the right sides of the inner surface 141I of the plastic rear cover 141 in accordance with the assisting brackets 133 and 135. The spacers 125 are coupled with the wall-mounted brackets 129 and 131, so that the reflector 127 is retained between the spacers 125 and the wall-mounted brackets 129 and 131. Next, the two ends of the lamps 119 are respectively inserted into the lamp slots 121 and the lamp supporter 123, and the lamps 119 are leant against the spacers 125 so a distance between the lamps 119 and the reflector 127 is maintained.

Figure 2E:
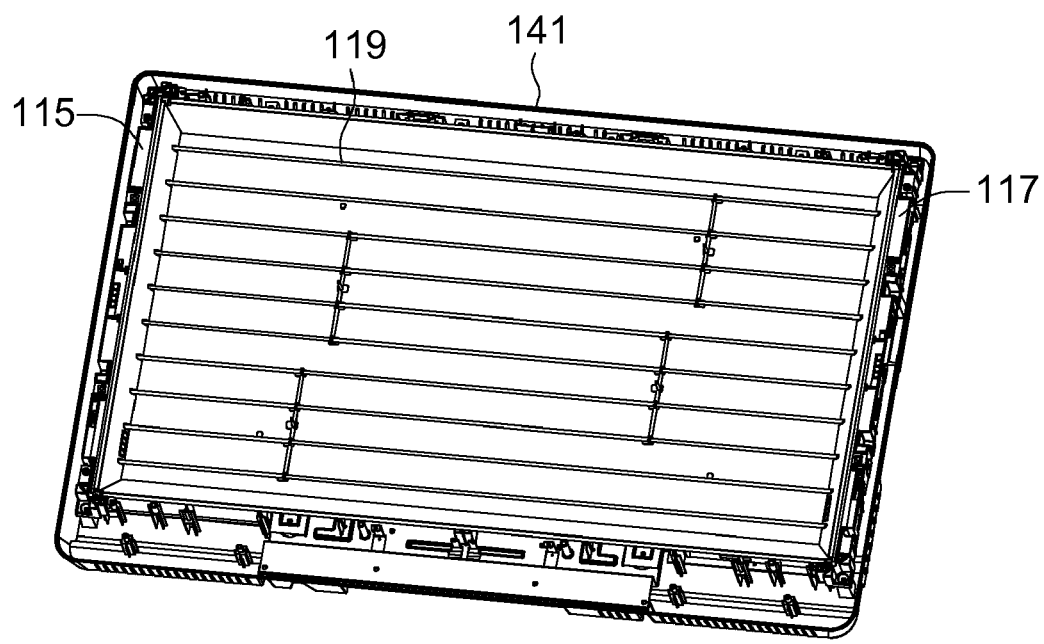

Next, as shown in FIG. 2E, the lamp brackets 115 and 117 are respectively assembled to the plastic rear cover 141 in accordance with the assisting brackets 133 and 135. Also, referring to FIG. 1A, the optical films 109 are assembled to the plastic rear cover 141, wherein the left and the right sides of the optical films 109 are respectively leant against the lamp brackets 115 and 117, and the assisting brackets 111 and 113 retain the top and the bottom sides of the optical films 109. Besides, the tips of the spacers 125 disposed on the reflector 127 are also leant against the optical films 109 to assist supporting the optical films 109 and keep a distance between optical films 109 and the reflector 127.

Figure 2F:
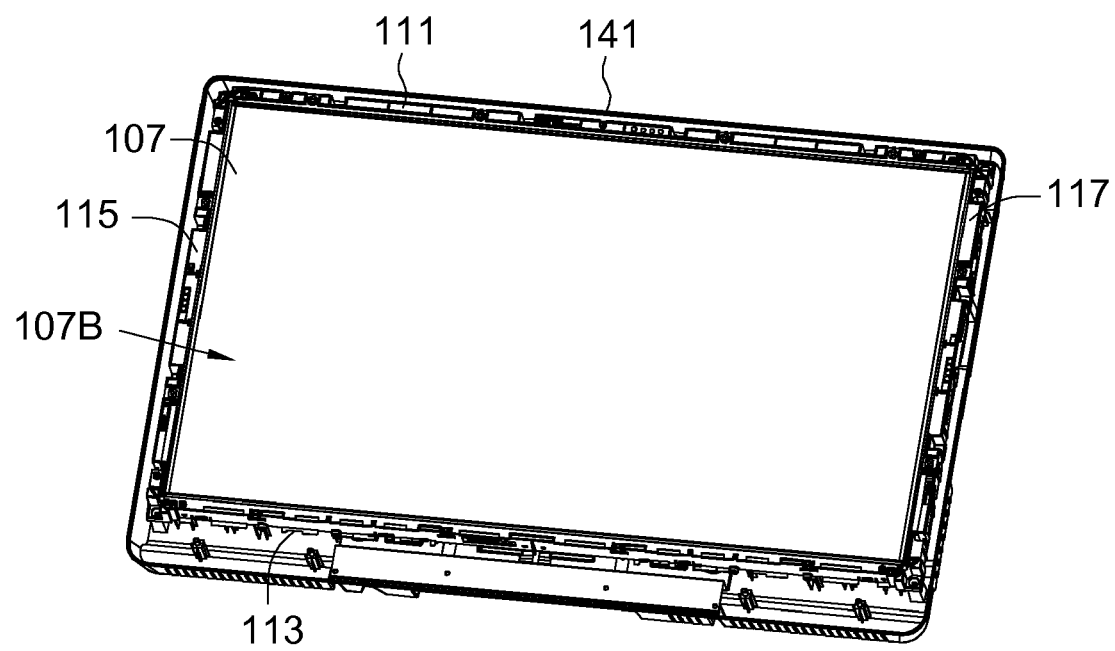

Then, the display panel 107 is disposed on the optical films 109. The first surface 107B (shown in FIG. 1A) of the display panel 107 faces downward. As shown in FIG. 2F, the top and the bottom sides of the display panel 107 after assembled are leant against the assisting brackets 111 and 113 respectively, the left and the right sides are leant against the lamp brackets 115 and 117 respectively, and the second surface 107B of the display panel 107 faces upwards.

Figure 2G:
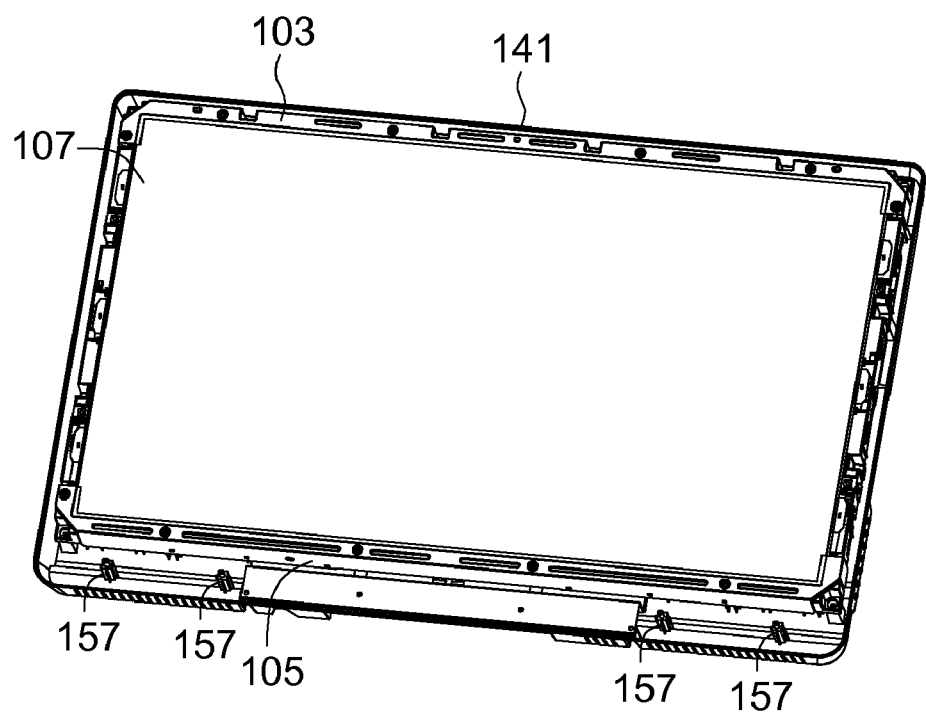

Next, as shown in FIG. 2G, the two metal brackets 103 and 105 are disposed at the top and the bottom sides of the display panel 107. The metal brackets 103 and 105 enhance the structural strength of the display panel 107 along a horizontal direction and support the display panel 107 for fixing the display panel 107 onto the plastic rear cover 141. Furthermore, most of the transmission cables, chip on films (COFs), or integrated circuits (ICs) of the display panel 107 is/are located on the lower portion of the display panel 107. When the metal bracket 105 covers the bottom edge of the display panel 107, the metal bracket 105 further provides electromagnetic protection for the display panel 107. Therefore, in another embodiment, the metal bracket 103 can be omitted and remain the metal bracket 105 only. On the other hand, if the transmission cables, chip on films (COFs), or integrated circuits (ICs) is/are located on the upper portion of the display panel 107, the metal bracket 105 can be omitted and remain the metal bracket 103 only.

Figure 2H:
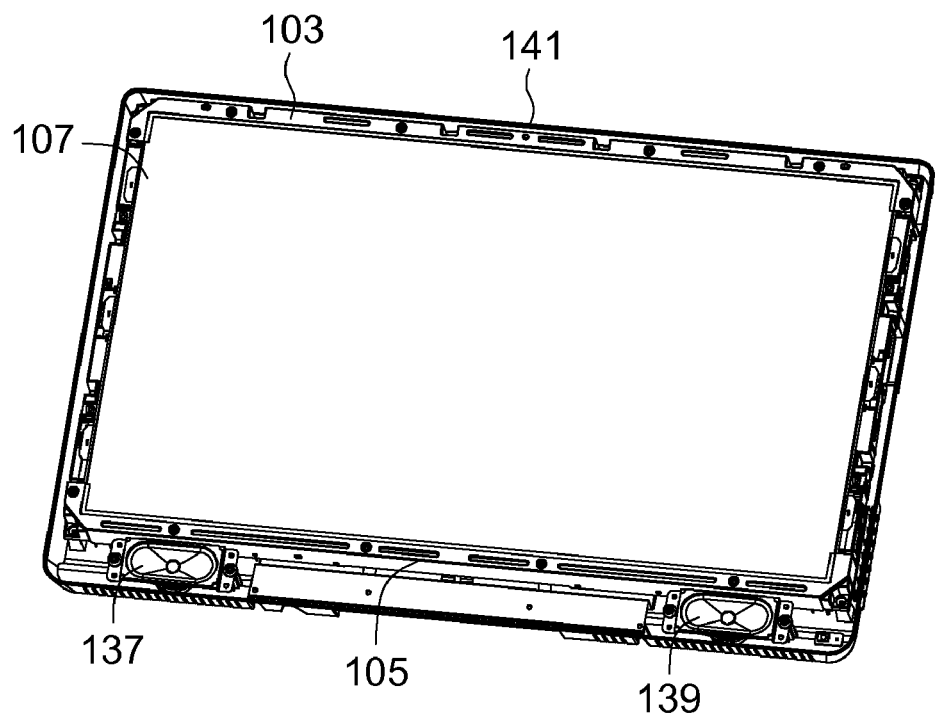

Afterwards, as shown in FIG. 2H, the two speakers 137 and 139 are fixed on the plastic rear cover 141 through the locking holes 157A (shown in FIG. 3B) of the column structures 157.

Figure 2I:
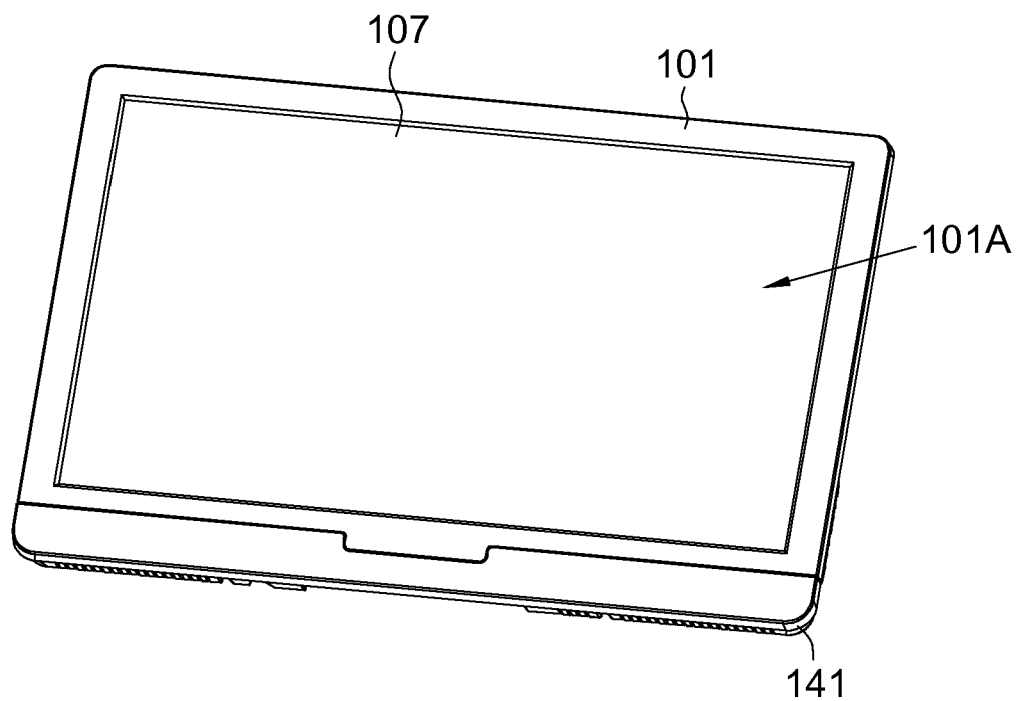
Figure 2J:
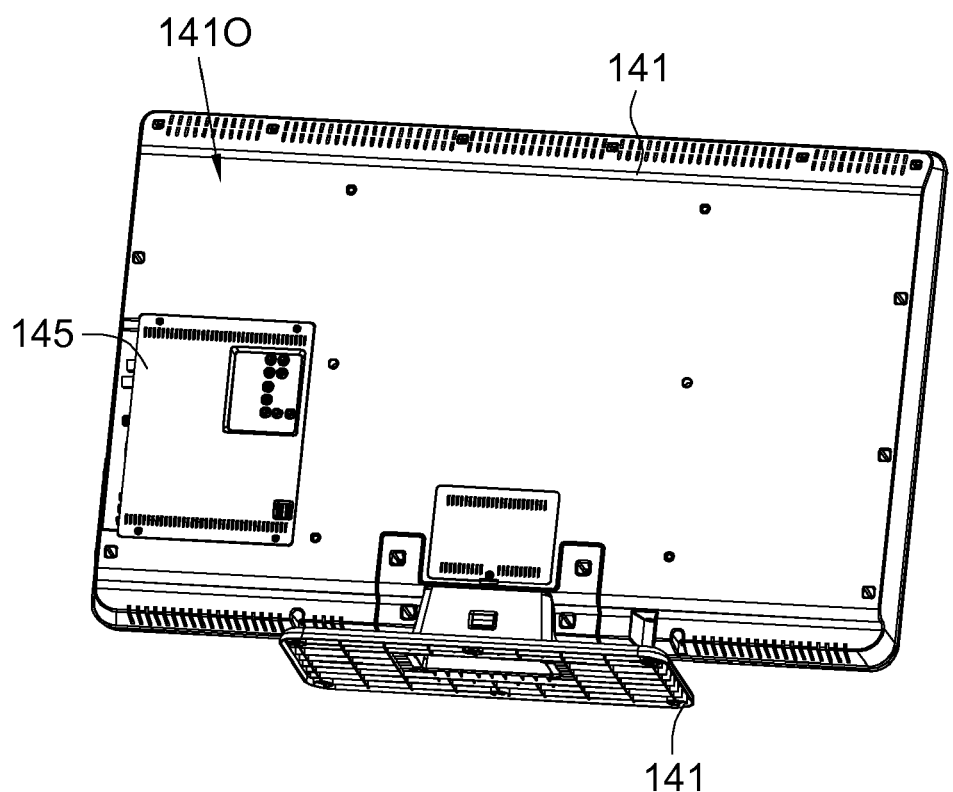

Then, as shown in FIG. 2I, the plastic front cover 101 and the plastic rear cover 141 are combined together. As shown in FIG. 1A, the control module 143 is installed into the receiving portion 141A, and then the control module casing 145 is assembled to the plastic rear cover 141 for protecting and hiding the control module 143. Also, the stand 114 and the plastic rear cover 141 are combined together as shown in FIG. 2J.

FIG. 5A is a diagram showing the display device in FIG. 1A after assembled. As the components of the display device 100 along the horizontal direction (the x direction) are not exactly the same as that along the vertical direction (the y direction), the sectional structures on different planes such as y-z plane 5B and x-z plane 5C are not identical and are elaborated below.

Figure 5B:
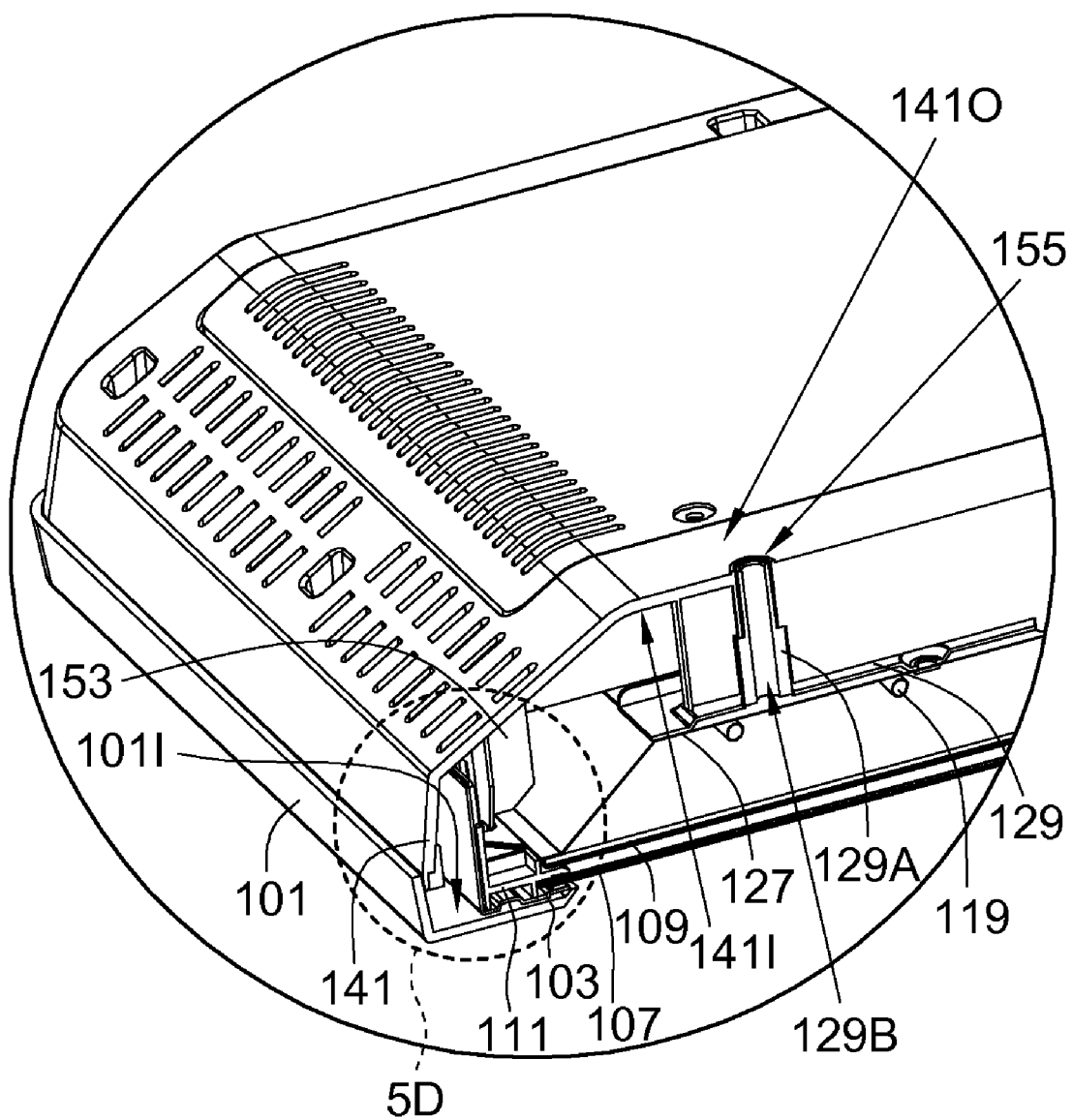
FIG. 5B is a partial lengthwise-sectional view of the display device in FIG. 5A.

Referring to FIG. 5B, a partial lengthwise-sectional view of the display device in FIG. 5A, that is, a partial view of y-z plane 5B, is shown. In FIG. 5B, the protrusion 129A of the wall-mounted bracket 129 passes through the plastic rear cover 141, and the wall-mounted hole 129B is disposed in accordance with the through hole 155. The reflector 127 is leant against the wall-mounted bracket 129 and slanted supporting ribs 153, and the lamps 119 are disposed between the reflector 127 and the optical films 109. The assisting bracket 111 is disposed on the edge of the optical films 109 to fix the positions of the optical films 109. The edge of the display panel 107 is contained between the assisting bracket 111 and the metal bracket 103. The metal bracket 103 is leant against the inner surface 101I of the plastic front cover 101.

Figure 5C:
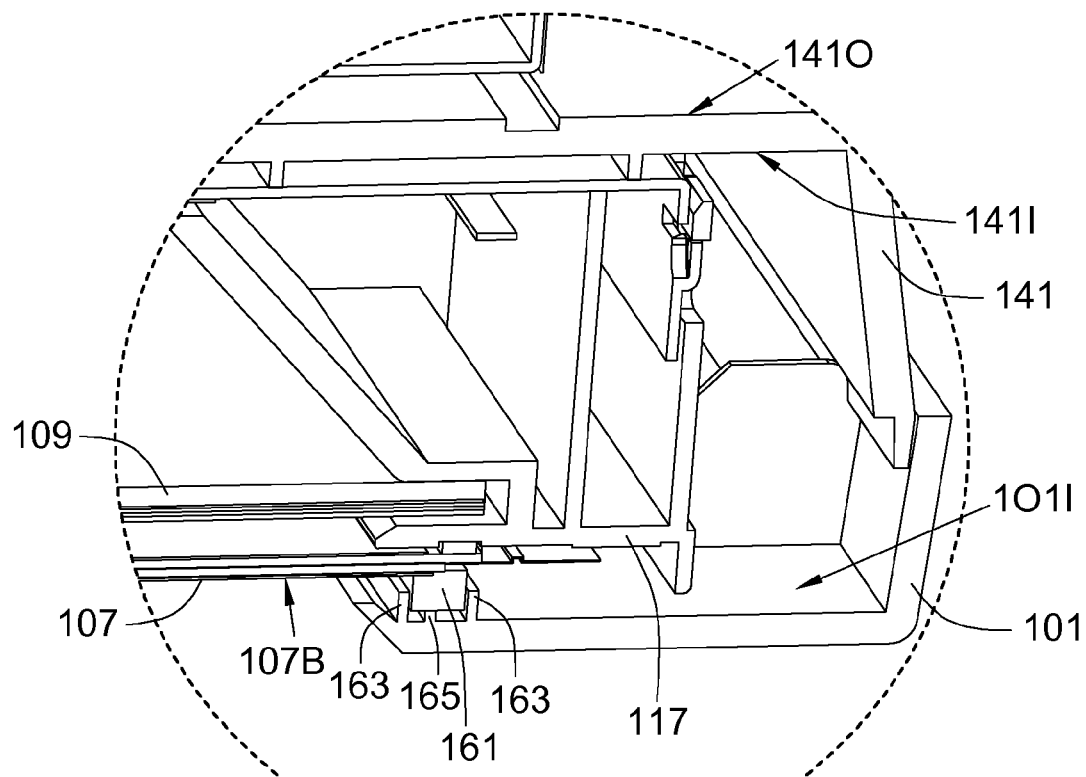
FIG. 5C is a partial cross-sectional view of the display device in FIG. 5A.

Referring to FIG. 5C, a partial cross-sectional view of the display device in FIG. 5A is shown, that is, a partial view of x-z plane 5C, is shown. In FIG. 5C, the display device 100 further includes a main buffer element 161 disposed along a vertical direction (the y direction) of FIG. 5A and leant against the edge (the other edge also has a main buffer element 161) of the second surface 107B of the display panel 107. The main buffer element 161 is made from soft materials such as foam, plastics or rubber. As the vertical direction of the display device 100 does not have any structures similar to the metal brackets 103 and 105 (shown in FIG. 1A), the use of metal is reduced, and the overall cost and weight of the display device 100 are also reduced. The disposition of the main buffer element 161 not only assists the supporting in the vertical direction (the y direction) but also avoids the plastic front cover 101 directly contacting the second surface 107B of the display panel 107 and prevents the display panel 107 from being scratched.

As shown in FIG. 5C, a plurality of retaining ribs 163 are protruded from the inner surface 101I of the plastic front cover 101. The retaining ribs 163 are disposed at two sides of the main buffer element 161 for positioning the main buffer element 161 on the plastic front cover 101. As the thickness of the main buffer element 161 does not always comply with design requirements and the main buffer element 161 has to directly contact the plastic front cover 101 and the display panel 107, the position height of the main buffer element 161 needs to be adjusted so as to fit the above design requirements. To adjust the position height of the main buffer element 161, the main buffer element 161 is leant against a pad 165 that is disposed between the retaining ribs 163.

Figure 5D:
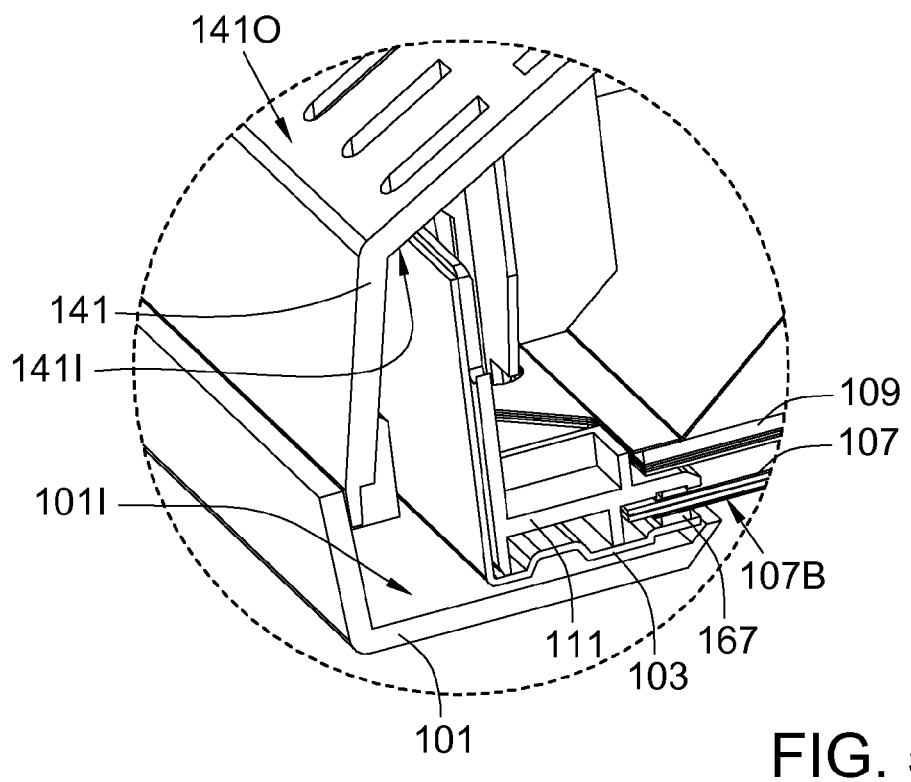
FIG. 5D is a partial enlargement of the sectional view of the display device in FIG. 5B.

Referring to FIG. 5D, a partial enlargement of the sectional view of the display device in FIG. 5B, that is, a partial enlargement of y-z plane 5B, is shown. Preferably, a secondary buffer element 167 can be disposed between the second surface 107B of the display panel 107 and the metal brackets 103 and 105 (shown in FIG. 1A) to prevent the second surface 107B of the display panel 107 from being scratched by the metal brackets 103 and 105. The secondary buffer element 167 can be made from soft materials such as foam, rubber or plastics. The secondary buffer element 167 differs from the main buffer element 161 disposed in the vertical direction in that the secondary buffer element 167 is disposed within a smaller gap due to the metal brackets 103 and 105 disposed in the horizontal direction (the x direction). Thus, the thickness of the secondary buffer element 167 is smaller than that of main buffer element 161. However, in the embodiment which omits one of the metal brackets 103 and 105, the partial cross-sectional view of that may as the same as the partial view of x-z plane 5C.

Preferably, the thickness of the main buffer element 161 is in the range from about 3 mm to about 4 mm, and the thickness of the secondary buffer element 167 is in the range from about 1 mm to about 2 mm. The height of the retaining ribs 163 (shown in FIG. 5C) disposed at two sides of the main buffer element 161 is in the range from about 3 mm to about 3.5 mm, and the height of the pad 165 (shown in FIG. 5C) disposed under the main buffer element 161 is in the range from about 0.5 mm to about 1 mm.

According to the conventional process of manufacturing the display device such as the full integration TV (FIT), the flat TV, the liquid crystal monitor, the display module or the full integration module (FIM) is normally manufactured first and then passed to a system plant for assembly. The display module normally includes a display panel and a front and a rear frame for fixing the panel. The system plant further assembles components such as the display module, the lamps, and the optical films into the front and the rear outer casings. Under the current trend of large-sized display products, the transportation and manufacturing costs of materials are high. Also, the repetition in the structural support of the display device is indeed a waste of materials.

According to the display device disposed in the above embodiments of the invention, two opposite edges of the display panel are fixed by the metal bracket, and another two opposite edges are fixed by soft buffer elements, not only simplifying the structure of the display device but also supporting the display panel and maintaining the structural strength of the display panel. Supporting ribs are protruded from the plastic rear cover of the display device for supporting most components inside the device and strengthening the structure of the display device. The display device disclosed in the above embodiments of the invention effectively resolves the conventional repetition problem in the structure of a display device, thus decreasing the use of material, the weight of the device as well as relevant material cost, transportation cost and manufacturing cost of the product. The invention indeed lives up to manufacturers' expectation of products, and makes the products more competitive.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display device, comprising:
    a control module;
    a plastic rear cover comprising a plurality of supporting ribs and a plurality of slanted supporting ribs respectively protruded from a central area and a peripheral area of an inner surface of the plastic rear cover, wherein an outer surface of the plastic rear cover has a receiving portion, in which the control module is received;
    a reflector leant against the slanted supporting ribs, wherein each of the slanted supporting ribs has a height over the top of the supporting ribs to keep a distance between the supporting ribs and the reflector;
    a display panel comprising a first surface and a second surface opposite to the first surface, wherein the first surface faces toward the inner surface of the plastic rear cover;
    a main buffer element leant against the second surface;
    a plastic front cover having a display opening for exposing a part of the second surface, wherein the plastic front cover is leant against the main buffer element; and
    a metal bracket disposed between the plastic front cover and the display panel.

2. The display device according to claim 1, further comprising a secondary buffer element disposed between the metal bracket and the second surface.

3. The display device according to claim 1, further comprising a wall-mounted bracket leant against the supporting ribs, wherein the wall-mounted bracket has a wall-mounted hole, the plastic rear cover further comprises a through hole aligning with the wall-mounted hole, and the reflector is leant against the wall-mounted bracket.

4. The display device according to claim 1, further comprising a speaker, disposed between the plastic front cover and the plastic rear cover.

5. A display device comprising:
    a plastic rear cover comprising a plurality of supporting ribs and a plurality of slanted supporting ribs respectively protruded from a central area and a peripheral area of an inner surface of the plastic rear cover;
    a reflector leant against the slanted supporting ribs, wherein each of the slanted supporting ribs has a height over the top of the supporting ribs to keep a distance between the supporting ribs and the reflector;
    a display panel comprising a first surface and a second surface opposite to the first surface, wherein the first surface faces toward an inner surface of the plastic rear cover;
    a main buffer element extended along a vertical direction and leant against the second surface;
    a secondary buffer element disposed along a horizontal direction vertical to the main buffer element and leant against the second surface;
    a metal bracket leant against the secondary buffer element; and
    a plastic front cover having a display opening for exposing a part of the second surface, wherein the plastic front cover is leant against the main buffer element.

6. The display device according to claim 5, wherein the thickness of the secondary buffer element is smaller than that of the main buffer element.

7. The display device according to claim 6, wherein the thickness of the main buffer element is in the range from about 3 mm to about 4 mm.

8. The display device according to claim 6, wherein the thickness of the secondary buffer element is in the range from about 1 mm to about 2 mm.

9. The display device according to claim 5, wherein the plastic front cover further comprises a plurality of retaining ribs, and the main buffer element is disposed between the retaining ribs.

10. The display device according to claim 9, wherein the height of the retaining ribs is in the range from about 3 mm to about 3.5 mm.

11. The display device according to claim 5, wherein the plastic front cover further comprises a pad, and the main buffer element is leant against the pad.

12. The display device according to claim 11, wherein the height of the pad is in the range from about 0.5 mm to about 1 mm.

13. A display device comprising:
    a plastic rear cover comprising an outer surface and an inner surface opposite to the outer surface, wherein a plurality of supporting ribs and slanted supporting ribs are respectively protruded from a central area and a peripheral area of the inner surface;
    a reflector leant against the slanted supporting ribs, wherein each of the slanted supporting ribs has a height over the top of the supporting ribs to keep a distance between the supporting ribs and the reflector;
    a display panel comprising a first surface and a second surface opposite to the first surface, wherein the first surface faces toward the inner surface of the plastic rear cover; and
    a plastic front cover has a surface that faces toward the second surface.

14. The display device according to claim 13, further comprising a wall-mounted bracket leant against the supporting ribs.

15. The display device according to claim 14, wherein the wall-mounted bracket has a wall-mounted hole, the plastic rear cover further comprises a through hole aligning with the wall-mounted hole.

16. The display device according to claim 13, wherein the supporting ribs form a grid structure.

17. The display device according to claim 13, further comprising a control module casing and a control module is covered by the control module casing.

18. The display device according to claim 17, wherein the outer surface has a receiving portion in which the control module is received.

19. The display device according to claim 13, wherein the reflector covers the supporting ribs and partially covers the slanted supporting ribs at two opposite edges of the supporting ribs.

* * * * *